(No Model.)
J. S. CONSIDINE.
WOOD BUNDLING MACHINE.
No. 459,812. Patented Sept. 22, 1891.
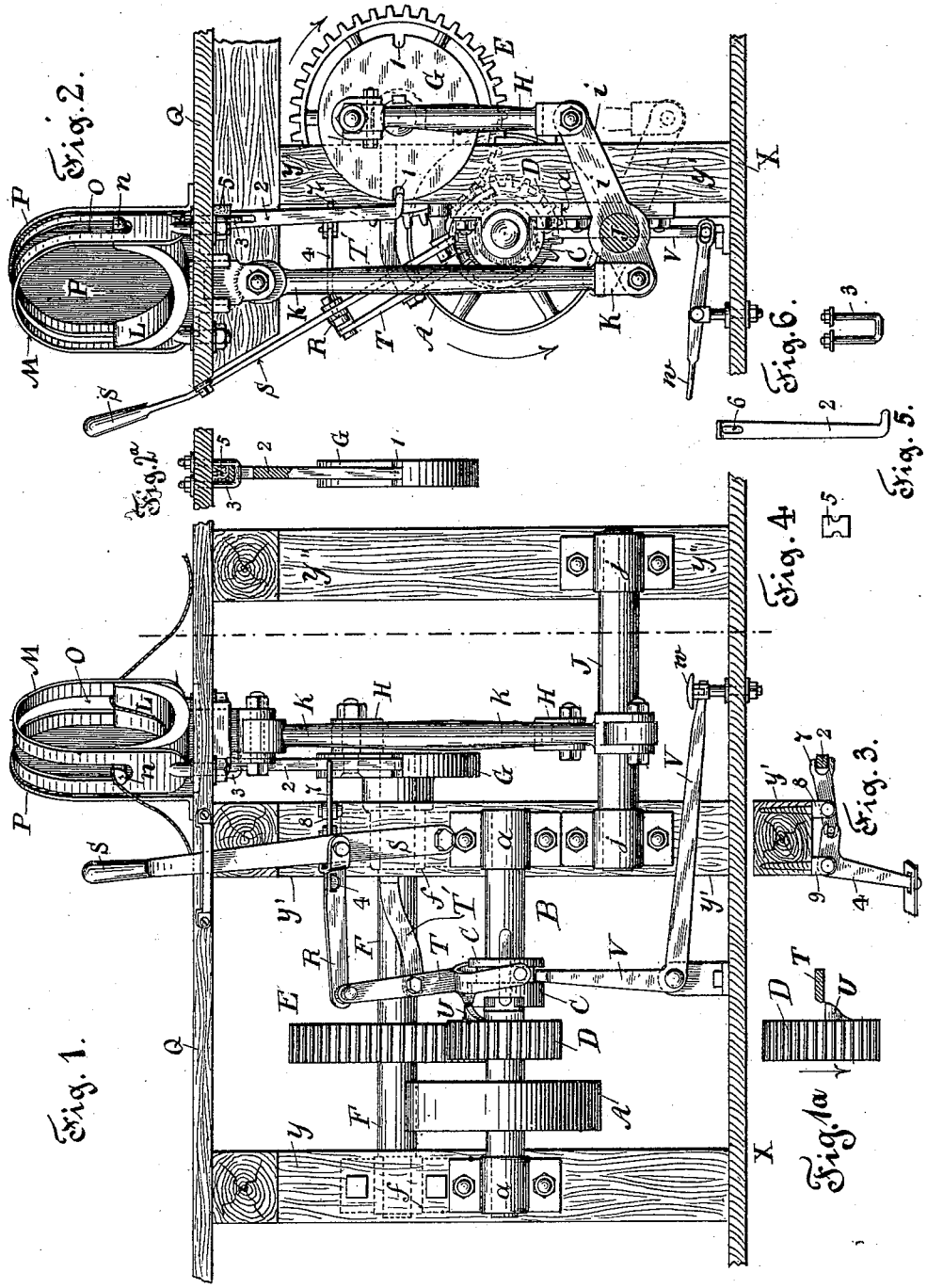
Witnesses
Chas. Hanimann
Warren W. Foster
Inventor
John S. Considine
By his Attorney
A. P. Smith

UNITED STATES PATENT OFFICE.

JOHN S. CONSIDINE, OF LOCK HAVEN, PENNSYLVANIA.

WOOD-BUNDLING MACHINE.

SPECIFICATION forming part of Letters Patent No. 459,812, dated September 22, 1891.

Application filed November 26, 1890. Serial No. 372,663. (No model.)

*To all whom it may concern:*

Be it known that I, JOHN S. CONSIDINE, a citizen of the United States, residing at Lock Haven, in the county of Clinton and State of Pennsylvania, have invented certain new and useful Improvements in Wood-Bundling Machines; and I do hereby declare the following to be a full, clear, and exact description of the invention, such as will enable others skilled in the art to which it appertains to make and use the same.

My invention consists of the improved form of machine for bundling kindling-wood, hereinafter to be more fully described and claimed.

In the drawings, Figure 1 is a side view of the machine with parts of the frame broken away. Fig. 1ª is a detail of the clutch-operating device. Fig. 2 is an end view and partial section. Fig. 2ª is a view of part of the locking device. Figs. 3, 4, 5, and 6 are details of the locking device.

This invention belongs to that class of machines designed for compressing a number of sticks of kindling-wood in a round bundle and holding them there till the bundle is tied up.

The main frame of the machine is composed of a table Q, supported on a number of upright pieces $y\ y'\ y''$, resting on the floor or bed X.

The driving-shaft B is constantly rotated by a belt running over a pulley A. This shaft is journaled in bearings $a\ a$, fastened to the uprights $y\ y'$. On this constantly-rotated driving-shaft is the loose pinion D. This pinion can be locked to the shaft B by the clutch C, which is feathered on the same shaft.

Meshing with the pinion D is the gear of double diameter E, having twice as many teeth and being mounted on the second shaft F, which is also journaled in bearings $f$, fastened to the uprights $y\ y'$. On the shaft F is the crank-disk G.

Connecting-rod H transmits motion to the long arm of the lever $i$, which is pivoted on the shaft J, journaled in bearings $j$, fastened to the uprights $y'\ y''$. From the shorter arm of the lever $i$ pitman K transmits motion to the reciprocating saucer L. This latter has ears $n\ n$, which slide in the slot O in the hood M. This hood is bolted to table Q, as shown.

The clutch C is controlled by lever T, which is pivoted to a fixed portion of the framework, such as the arm T', or by bell-crank lever V. The forked end of lever T meshes in a circumferential groove in the clutch and is operated by hand-lever S through link R or by treadle or foot-lever $w$ through the bell-crank V. This clutch is also automatically thrown out of engagement once in every revolution of the pinion D by the triangular lug U striking the lever T.

The locking device shown consists of a pawl 2, rendered elastic by means of the piece of rubber 5, against which its ends abut, hinged to the main frame by the stirrup-strap 3, or in some equivalent manner. The slot 6 in the pawl, through which the stirrup-strap 3 passes, allows said pawl to play up and down against the rubber 5. It is evident that this elasticity necesary to enable the pawl to withstand the shock of engagement with the notches 1 in the crank-disk G might be given it by other easily-understood methods of construction; but I prefer the above method for its simplicity. The tension of the spring-block 5 may be regulated by tightening the nuts on the end of the stirrup 3. The pawl 2 is thrown into and out of engagement by the forked lever 7, mounted on the bolt 8, driven into the upright $y'$. This lever is moved by the bell-crank lever 4, which is mounted on the bolt 9 and engages with the lever R.

It is evident that this locking device might be applied to any convenient member of the compressing mechanism without varying its mode of operation or departing from the spirit of my invention, though I have only shown it applied to the crank-disk.

The method of operating my invention is as follows: The pieces of wood are piled up in the saucer L, their ends butting against the plate P to even them. When a large enough bundle has been accumulated, the operator throws clutch C into gear by the hand-lever S or the foot-lever $w$. As this clutch is thrown into gear the levers 4 and 7 draw the pawl 2 out of one of the notches 1 and the compressing mechanism is free to operate. The pinion D makes one complete revolution, and then lug U throws the clutch C out of gear. The gear E has made only half a revolution, so that the other notch 1 has come around just as the forcing of clutch C out of gear forces locking-pawl 2 into gear with said notch, and the compressing apparatus is locked with the saucer L in its highest position, the bundle of wood having been compressed into circular shape. The string shown in Fig. 1 is tied about the bundle. The operator throws the clutch again into gear by means of the hand-lever or foot-lever, as may be most convenient, the pinion D makes another revolution, the gear E and crank-disk G are given their corresponding half-revolution, and the saucer L is drawn down to its lowest position and locked again. The bundle may then be removed and the operation repeated.

The advantages of my invention lie in its simplicity and compactness of construction, all parts being mounted on one row of uprights, in the convenience with which it may be operated by hand or foot, in the positive but elastic action of its locking device, and the connection of the same to the clutch, so that both cannot be thrown into gear at one time and the machine thereby broken.

Having therefore described my invention, what I claim as new, and desire to protect by Letters Patent, is—

1. In a wood-bundling machine, the combination, with a shaft and a pinion loose thereon, of a clutch splined to the shaft and arranged to engage the pinion, a beveled lug upon the pinion to throw the clutch out of engagement once in each revolution, a gear having double as many teeth as said pinion and intermeshing therewith, a crank upon the shaft with the gear, a stationary hood and a reciprocating saucer, a lever pivoted to the main frame below the saucer and crank, and pitmen connecting the opposite ends of the lever to the crank and the saucer, respectively, substantially as described.

2. In a wood-bundling machine, the combination of the constantly-rotating shaft, the pinion loose thereon, the clutch locking the pinion to the shaft, the compressing mechanism driven by said pinion, the locking device for said compressing mechanism, the hand-lever, and connection whereby the clutch and locking device may be simultaneously operated from said lever, one being thrown into action as the other is thrown out, substantially as described.

3. In a wood-bundling machine, the combination of the constantly-rotating shaft, the pinion loose thereon, the clutch locking the pinion to the shaft, the lug which automatically throws said clutch out of gear, the compressing mechanism driven by said pinion, the locking device for said compressing mechanism, and connections extending from the clutch to the locking mechanism, so that as the former is automatically thrown out of gear the latter is thrown into gear, substantially as described.

4. In a wood-bundling machine, the combination of the frame, the constantly-rotating driving-shaft, the pinion loose thereon, the clutch which locks the pinion to the shaft, the gear which is mounted on a second shaft and meshes with the pinion, the notched crank-disk on said shaft, the compressing apparatus driven from said disk, the elastic pawl hinged to the frame and engaging with the notches in said disk to lock the same, the hand-lever, and connections extending therefrom to the clutch, and the locking-pawl whereby one is thrown out of gear as the other is thrown in, substantially as described.

In testimony whereof I affix my signature in presence of two witnesses.

JOHN S. CONSIDINE.

Witnesses:
M. J. CONSIDINE,
W. B. THOMSON.